Nov. 23, 1965 OSAMU NAKAHARA 3,219,837

NEGATIVE RESISTANCE TRANSISTORS

Filed Feb. 23, 1963

INVENTOR.
OSAMU NAKAHARA

BY
Morgan, Finnegan, Durham & Pine
ATTORNEYS

United States Patent Office 3,219,837
Patented Nov. 23, 1965

3,219,837

NEGATIVE RESISTANCE TRANSISTORS

Osamu Nakahara, Tanaka, Sakyo-ku, Kyoto, Japan, assignor to Sanyo Electric Co., Ltd., Osaka, Japan Filed Feb. 23, 1961, Ser. No. 91,119
Claims Priority, application Japan, Feb. 29, 1960, 35/6,830
6 Claims. (Cl. 307—88.5)

This invention relates to improved transistors, and more particularly to transistors having improved characteristics for switching and related uses.

In switching operations of a variety of circuits and systems, it is necessary that a connecting link or a portion of the circuit or system be transferred from a high impedance-low current state to a low impedance-high current state in response to a prescribed condition. It has been proposed heretofore, that transistors be employed as circuit controlling elements or switches. To this end certain transistors have been proposed wherein, with the emitter connected to the base, the collector impedance remains large and the collector current small as the collector-emitter voltage is increased until a certain voltage is reached. Beyond this voltage the initially positive alternating current collector input resistance first passes through a negative resistance region and then falls to a low positive value. When the latter obtains, the collector current is high. This response is caused by the so-called "avalanche" breakdown. Thus, the transistor can be transferred from the high impedance-low current state to the low impedance-high current condition by application of an appropriate reverse biasing pulse to the collector. The above avalanche breakdown may, therefore, be utilized for switching operation.

However, in the known type of transistors, the critical voltage point, that is, the reverse collector voltage beyond which the transistor, in effect, trips to the low impedance state, is well beyond the saturation point and moreover is so high that the structural failure point approaches.

A principal object of the invention is to provide a new and improved transistor for switching use and other negative resistance applications which can operate at a relatively low voltage portion of its characteristic curve i.e., without the need for creating avalanche breakdown.

Another object of the invention is to attain, in connection with the above principal object, large values of negative conductance at a relatively low voltage portion of the characteristic curve of the transistor.

These and other objects of the invention will be understood upon consideration of the accompanying specification, claims, and drawings of which:

Figure 1:
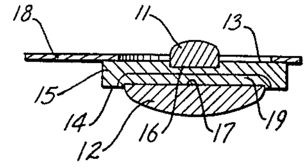
FIG. 1 is a schematic, cross-sectional, elevational view of an embodiment of the transistor according to the invention.
Figure 2:
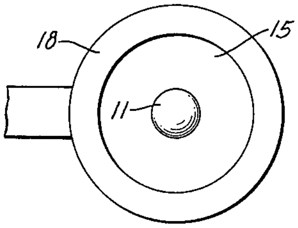
FIG. 2 is a plan view of the transistor illustrated in FIG. 1.

Referring now to the drawing, FIGS. 1 and 2 show a p–n–p triode transistor according to the present invention. This transistor comprises, for example, an emitter electrode 11 and a collector electrode 12 surface alloyed in coaxial alignment upon opposite faces 13 and 14, respectively, of a base wafer 15. The emitter 11 and the collector 12 are made of p-type semiconductive material while the base 15 is made of n-type semiconductive material. The junction area 16 of the emitter 11 is smaller than the junction area 17 of the collector 12. 18 is the electrode which is connected to the base 15 and 19 indicates the space charge layer which exists near the junction area 17 of the collector 12.

Figure 3:
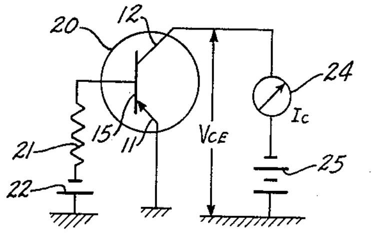
FIG. 3 is a schematic representation of the switching circuit including the transistor according to the invention in which the emitter is earthed.

FIG. 3 shows a circuit including such a transistor 20 for switching use as illustrated in FIGS. 1 and 2. The transistor has a base 15 with which an emitter electrode 11 and a collector electrode 12 make rectifier contact. The base 15, the emitter 11 and the collector 12 are earthed, respectively, the first through a resistor 21 and a battery 22, the second directly and the third through an ammeter 24 instead of a load, and a battery 25. Accordingly an effective voltage is applied in the forward direction between the emitter 11 and the base 15.

The base of a transistor has an excess of one type of electric current carriers, electrons or holes, with respect to current carriers of the opposite type. The excess carriers are called "majority" carriers and the opposite type carriers are called "minority" carriers. The operation of many semiconductor devices depends on minority carriers being injected into a semiconductor base at the emitter and being collected at the collector after traversing a substantial portion of the bulk of the base. The amount of the minority carriers injected from the emitter is represented as follows:

$$(exp(q.V_{BEj}/KT)$$

where $q$ is the magnitude of the electric charge of an electron, namely $1,602\times10^{-19}$ coulomb, $V_{BEj}$ is the junction voltage at the emitter-base junction, K is the Boltzmann's constant and T is an absolute temperature. It is known that $V_{BEj}$ may be determined by the voltage drop across the base resistance resulting from a certain external voltage $V_{BE}$ which is applied between the emitter and base electrode of a transistor. The base resistance or base conductivity of a transistor varies i.e., is modulated, according to both the variation in the space charge layer at the collector junction and the variation of the minority carriers injected from the collector. When a positive voltage is applied to the collector relative to the base, the space charge layer is oriented toward the collector and minority carriers are injected from the collector junction. The majority carriers in turn flow from the base electrode into the base to neutralize the above minority carriers so that the base resistance is reduced. As the voltage applied between the collector and the base varies from positive to negative so as to become a reverse voltage, the space charge layer is expanded within the base and the minority carriers injected from the collector junction are decreased so that the base resistance is increased. Accordingly, the base resistance or conductivity is a function of the voltage between the collector and the base and the modulation of this conductivity depends on the voltage applied to the collector.

The inventor has found that the higher the resistivity of the base, especially the higher the resistivity of the annular portion of the base which excludes the base material underlying the emitter and the base material outside the collector, the larger the conductivity modulation of the base. The principal means of implementing the invention is to enlarge the conductivity modulation in the base by using material of a high resistivity for the base. Accordingly, with a relatively low voltage applied between the emitter and base electrodes in the forward direction, an increase in the collector voltage 25 in the negative direction towards a zero net collector-base-voltage may control the injection of the minority carriers from the emitter junction principally by reason of the decrease in carriers injected from the collector junction with a resulting appearance of a negative resistance in the collector circuit.

According to the invention, of the base 15 as illustrated in FIGS. 1 and 2, at least the annular portion having an inner periphery corresponding with the periphery of the emitter junctions and an outer periphery corresponding with the periphery of the collector junction, is made of semiconductive material having a considerably higher resistivity than is usual in transistors, for example, semiconductive germanium having a resistivity within the range of 30 to 50 ohm-cm., preferably, or about 40 ohm-cm. It will be observed that such a high resistivity as required according to the invention is near to that of the resistivity of the intrinsic semiconductor. The whole base 15 may be made of material having such a high resistivity as above with an appropriate dimensional design. The semiconductive material having such a high resistivity as 40 ohm-cm. may be manufactured by adding donor impurities such as antimony and arsenic, or, acceptor impurities such as indium and gallium to germanium.

Figure 4:
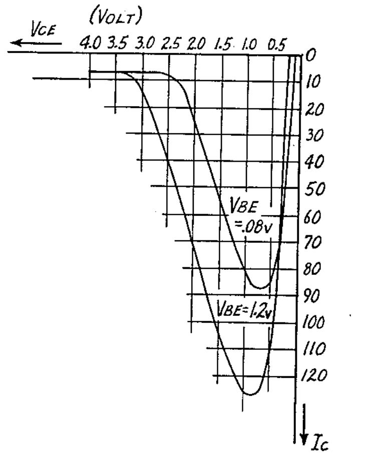
FIG. 4 is a graph representing the operating characteristics of the circuit of FIG. 3.

FIG. 4 shows, by way of example, two $V_{CE}$–$I_C$ characteristic curves of the circuit illustrated in FIG. 3 in which the voltages between the base and the emitter are for the two cases 0.8 volt and 1.2 volts, respectively. $V_{CE}$ represents the voltage between the collector and emitter and $I_C$ represents the collector current in ma. It is to be noted that the circuit includes a transistor 20 whose base is made of n-type (strictly to say $\nu$-type) semiconductive germanium having a resistivity of 40 ohm-cm. and whose emitter 11 is earthed. During the state in which the collector is substantially biased positively (i.e., with source 25 near zero), the space charge layer is oriented toward the collector and the minority carriers are injected from the collector. The transfer of the majority carriers in the base, which neutralizes the above minority carriers, in turn increases the conductivity of the base, especially of its portion near the periphery of the collector, the base resistance being thereby decreased. At this state of decrease base resistance, the voltage applied to the emitter junction ($V_{BEj}$) is close to the input voltage 22 and the emitter junction can inject minority carriers to increase the collector current. As the voltage between the collector and base varies towards the negative direction, however, e.g. by increase of source 25, the base resistance begins to increase due to both the space charge layer expanding within the base region and to the exponential decrease of the minority carriers injected from the collector. This decreases the minority carriers injected from the emitter junction notwithstanding the constant voltage between the base and emitter, because of the increased direct current voltage drop in the base circuit. If this base resistance modulation feedback effect overcomes the internal feedback effect which tends to increase the collector current, then collector current will begin to decrease with increase in the voltage between the collector and emitter; thus a negative resistance effect appears in the collector circuit. After that the respective characteristic curves will converge into the $V_{CE}$–$I_C$ characteristic curve applicable when the emitter is short-circuited to the base.

In the transistor according to the invention whose base is made of material having a relatively high resistivity at least at its portion from the periphery of the emitter to the periphery of the collector in the direction toward its electrode, the critical voltage point, that is, the reverse collector voltage beyond which the transistor, in effect, trips to the low current state, appears as shown in FIGURE 4, at a relatively low reverse voltage between the collector and emitter, far from the avalanche point of prior art transistors.

In addition, a high speed switching action from a low resistance-high current state to a high resistance-low current state can be obtained by use of the base including such graded impurities that the minority carriers may be accelerated in the direction from the emitter to the collector. It is also to be noted that the internal feedback effect is much smaller in the case of the graded impurity base than the simple p-$\nu$-p structure so that the shape of the negative resistance curve becomes more salient than that observed in the latter structure. Various configurations of the transistor can be calculated to realize such a characteristic and optimum design developed in accordance with the required negative resistance property.

Semiconductive materials other than germanium may also be utilized in devices according to the principles of the invention. In general any crystalline semiconductive material that conducts electric current by electronic transport as distinguished from ionic transport may be used to make devices according to the invention. Examples of known, practical materials are silicon, germanium-silicon alloys, and compounds of aluminum, gallium or indium with phosphorous, arsenic or antimony.

What I claim is:

1. A transistor exhibiting negative resistance effects independent of avalanche mechanism and adapted to be energized by a source, said transistor comprising an emitter and a collector of semi-conductive material of one conductivity type upon the opposite faces respectively of a base of semi-conductive material of the opposite conductivity type, the effective junction area of said emitter being smaller than that of said collector whereby a section of said base is external to the base region common to both collector and emitter, said external section of said base having means including a portion made of semiconductive material having a relatively high resistivity for causing modulation of base resistivity by collector voltage in the saturation region to a degree sufficient to produce in the region of saturation a decreasing collector current as collector voltage is increased whereby a negative resistance effect obtains.

2. A transistor according to claim 1 in which at least a portion of said external base section means is made of semiconductive germanium having a resistivity within the range of 30 to 50 ohm-cm.

3. A transistor exhibiting negative resistance effects independent of avalanche mechanism and adapted to be energized by a source comprising an emitter and a collector jointed upon the opposite faces, respectively of a base of semiconductive material and located thereon in such a relative orientation that a section of said base adjacent the collector is outside the region common to both collector and emitter, at least a part of said section including means having a relatively high resistivity approaching the resistivity of the intrinsic semi-conductive material such that an increasing collector voltage produces an increased base resistance of sufficient magnitude to decrease the net emitter junction injection and to decrease collector current whereby negative resistance properties occur in the collector circuit.

4. A transistor according to claim 3 in which the whole base is made of semiconductive germanium with impurities having a resistivity within the range of 30 to 50 ohm-cm.

5. A transistor according to claim 1 in which the base is of such a graded impurity type that the minority carriers are accelerated in the direction from the emitter to the collector.

6. In a semiconductive switching device having a transistor-energizing source, the combination of a transistor which comprises an emitter and collector jointed upon the opposite faces, respectively, of a base of semiconductive material, the junction area of said emitter being disposed relative to the junction area of said collector such that at least the portion of said base comprises means adjacent said collector and outside the region common to both emitter and collector, said means being made of semiconductive material having a resistivity sufficiently high so that the conductivity modulation in the base at a certain, relatively low collector voltage overcomes internal feedback and results in the controlling of emitter current to achieve a negative resistance characteristic in the collector circuit.

References Cited by the Examiner

UNITED STATES PATENTS

| | | | |
|---|---|---|---|
| 2,810,870 | 10/1957 | Hunter et al. | 307—88.5 |
| 2,962,605 | 11/1960 | Grosvalet | 307—88.5 |
| 2,983,854 | 5/1961 | Pearson | 317—235 |
| 3,054,912 | 9/1962 | Strull et al. | 307—88.5 |
| 3,091,701 | 5/1963 | Statz | 307—88.5 |

OTHER REFERENCES

"Avalanche Transistors," by R.C.V. Macario Electronic Engineering, May 1959 (pages 262 to 267 relied upon).

Handbook of Semiconductor Electronics, by L. P. Hunter, 1956, McGraw-Hill Book Co., Inc., pages 15–19 relied on.

ARTHUR GAUSS, *Primary Examiner.*

HERMAN K. SAALBACH, JOHN W. HUCKERT, *Examiners.*